(12) United States Patent
Weber

(10) Patent No.: US 10,795,076 B2
(45) Date of Patent: Oct. 6, 2020

(54) POWER CONNECTOR FOR AN LED STRIP ASSEMBLY OF A LIGHT FIXTURE

(71) Applicant: TE CONNECTIVITY CORPORATION, Berwyn, PA (US)

(72) Inventor: Ronald Martin Weber, Annville, PA (US)

(*) Notice: Subject to any disclaimer, the term of this patent is extended or adjusted under 35 U.S.C. 154(b) by 0 days.

(21) Appl. No.: 16/228,129

(22) Filed: Dec. 20, 2018

(65) Prior Publication Data
US 2020/0200965 A1 Jun. 25, 2020

(51) Int. Cl.
*F21V 23/04* (2006.01)
*F21V 8/00* (2006.01)

(52) U.S. Cl.
CPC .......... *G02B 6/0083* (2013.01); *G02B 6/009* (2013.01); *G02B 6/0068* (2013.01); *G02B 6/0073* (2013.01)

(58) Field of Classification Search
CPC .................................................. G02B 6/0073
See application file for complete search history.

(56) References Cited

U.S. PATENT DOCUMENTS

2011/0136394 A1* 6/2011 Mostoller ............. F21K 9/00
439/701

FOREIGN PATENT DOCUMENTS

| DE | 20 2013 100981 U1 | 6/2014 |
|---|---|---|
| EP | 2 910 850 A1 | 8/2015 |
| EP | 3 104 464 A2 | 12/2016 |
| WO | 2015/127015 A1 | 8/2015 |

OTHER PUBLICATIONS

International Search Report, International Application No. PCT/IB2019/059743, International Filing Date, Nov. 13, 2019.

* cited by examiner

*Primary Examiner* — Georgia Y Epps
*Assistant Examiner* — Jacob R Stern

(57) ABSTRACT

An LED strip assembly for a light fixture includes a PCB strip and a power connector electrically connected thereto. A rear of the PCB strip is mounted to a support wall of a frame of the light fixture and LEDs are mounted to a front of the PCB strip. The power connector includes a connector housing having a contact cavity and a mounting tab configured to be mounted to the support wall of the frame of the light fixture. The power connector includes a power wire assembly coupled to the connector housing having a power wire and a power wire contact terminated thereto. The power wire contact has a spring beam mechanically and electrically connected to a power pad of the PCB strip at a separable mating interface to electrically connect the power wire to a power circuit of the PCB strip.

20 Claims, 4 Drawing Sheets

POWER CONNECTOR FOR AN LED STRIP ASSEMBLY OF A LIGHT FIXTURE

BACKGROUND OF THE INVENTION

The subject matter herein relates generally to edge lit light emitting diode (LED) fixtures.

Light fixtures, such as edge lit LED fixtures, are used in lighting applications, such as for ceiling lighting, such as in drop ceilings. The edge lit LED fixtures have a low profile and may be used to replace conventional fluorescent light fixtures. The edge lit LED fixture includes a frame holding an LED strip assembly that emits light into an optical element held by the frame. The edge lit LED fixture positions the LED strip assembly at the sides of the frame with the light beaming across the optical element, which redirects the light to the inner surface of the optical element.

However, known edge lit LED fixtures are not without disadvantages. For instance, powering the LED strip assemblies is achieved by hand soldering power wires to solder pads on a printed circuit board (PCB) of the LED strip assembly. Soldering the wires to the LED strip assemblies is time consuming and increases assembly and manufacturing costs. Repair or replacement of the wiring and/or the LED strip assemblies is difficult. Additionally, the wires may lead to shadowing effects if the wires partially block one or more of the LED light sources. Moreover, known edge lit LED fixtures position the light guide of the optical element in close proximity to the LEDs, and in some situations abutting against the LEDs, leaving very little room for other components in the fixture.

A need remains for a cost effective, more manufacturable and reliable edge lit LED fixture.

BRIEF DESCRIPTION OF THE INVENTION

In one embodiment, an LED strip assembly is provided for a light fixture. The LED strip assembly includes a PCB strip having a front and a rear extending between a first side and a second side. The rear is configured to be mounted to a support wall of a frame of the light fixture. The PCB strip has a power circuit and LEDs mounted to the front of the PCB strip and powered by the power circuit. The PCB strip has a power pad at the front of the PCB strip electrically connected to the power circuit. The LED strip assembly includes a power connector electrically connected to the PCB strip. The power connector includes a connector housing having a contact cavity. The connector housing has a mounting tab configured to be mounted to the support wall of the frame of the light fixture. The power connector includes a power wire assembly coupled to the connector housing. The power wire assembly includes a power wire and a power wire contact terminated to the power wire. The power wire contact has a spring beam mechanically and electrically connected to the power pad at a separable mating interface to electrically connect the power wire to the power circuit.

In another embodiment, a power connector is provided for an LED strip assembly of a light fixture. The power connector includes a connector housing having a main body and a support arm extending from the main body. The main body has a contact cavity and the support arm having a contact channel open to the contact cavity. The support arm has a mounting tab configured to be mounted to a support wall of a frame of the light fixture. The power connector includes a power wire assembly coupled to the connector housing having a power wire contact coupled to a wire end of a power wire. The power wire contact has a mating end and a terminating end. The terminating end is received in the contact cavity and is terminated to the wire end of the power wire. The mating end includes a deflectable spring arm received in the contact channel having a mating interface. The spring arm is spaced apart from the terminating end by a gap. The gap is configured to receive the support wall of the frame of the light fixture. The support arm insulates the spring arm from the support wall of the frame.

In a further embodiment, a light fixture is provided including a frame and an LED strip assembly coupled to the frame. The frame surrounds a frame opening and has a base and a support wall extending from the base. The support wall has an inner surface facing the frame opening and an outer surface opposite the inner surface. The frame is configured to support an optical element in the frame opening. The LED strip assembly includes a PCB strip having a front and a rear extending between a first side and a second side. The rear is coupled to the inner surface of the support wall with the front facing the optical element in the frame opening. The PCB strip has a power circuit and LEDs mounted to the front of the PCB strip and powered by the power circuit to emit light to the optical element. The PCB strip has a power pad at the front of the PCB strip electrically connected to the power circuit. The LED strip assembly includes a power connector terminated to the PCB strip. The power connector includes a connector housing having a contact cavity. The connector housing has a mounting tab mounted to the support wall of the frame of the light fixture. The power connector includes a power wire assembly coupled to the connector housing. The power wire assembly includes a power wire and a power wire contact terminated to the power wire. The power wire contact has a spring beam mechanically and electrically connected to the power pad at a separable mating interface to electrically connect the power wire to the power circuit.

DETAILED DESCRIPTION OF THE INVENTION

Figure 1:
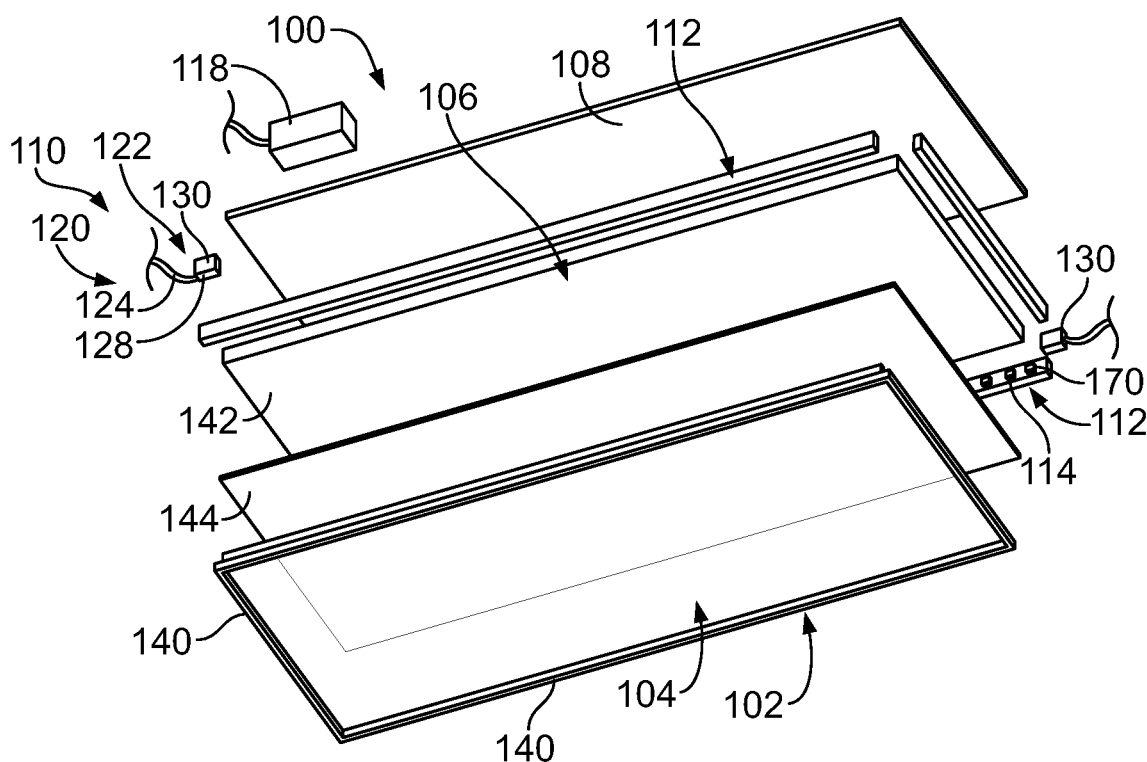
FIG. 1 is an exploded view of an edge lit LED fixture in accordance with an exemplary embodiment.

FIG. 1 is an exploded view of a light fixture 100 in accordance with an exemplary embodiment. In an exemplary embodiment, the light fixture 100 is an edge lit LED fixture and may be referred to hereinafter as an edge lit LED fixture 100. However, the light fixture 100 may be another type of light fixture, such as a backlighting fixture, a panel lighting fixture, a cove lighting fixture, wall wash lights, a decorative lighting fixture, and the like. The light fixture 100 utilizes strip LEDs for lighting effect.

The edge lit LED fixture 100 includes a frame 102 surrounding a frame opening 104. The edge lit LED fixture 100 includes an optical element 106 configured be received in the frame opening 104 and supported by the frame 102. The edge lit LED fixture 100 includes a back cover 108 configured to be coupled to the frame 102 to enclose the optical element 106. The edge lit LED fixture 100 includes an LED strip assembly 110 for lighting the edge lit LED fixture 100.

The LED strip assembly 110 includes a PCB strip 112 having LEDs 114 electrically connected to a power circuit of the PCB strip 112. A power supply, such as a power driver 118, is used to supply power to the PCB strip 112. The power driver 118 may be controlled to turn the LED strip assembly 110 on or off and/or to provide dimming capabilities.

The LED strip assembly 110 includes a power connector 120 terminated to the PCB strip 112. The power connector 120 includes a power wire assembly 122 having a power wire 124. The power wire 124 is electrically connected to the power driver 118. In various embodiments, the power wire 124 may be routed within the frame 102 to the PCB strip 112. The power wire assembly 122 includes a power wire contact 128 terminated to the wire end of the power wire 124 and a connector housing 130 holding the power wire contact 128. The power wire contact 128 is mechanically and electrically connected to a power pad 170 (shown in FIG. 3) of the PCB strip 112. The power connector 120 provides a connectorized connection for the power wire 124 to the PCB strip 112. The power wire contact 128 eliminates soldering of the power wire 124 to the PCB strip 112. In various embodiments, the power wire contact 128 defines a separable mating interface for mating with the PCB strip 112. For example, the power wire contact 128 may define a plug interface configured be mated with the PCB strip 112 by a plugging action.

In an exemplary embodiment, the frame 102 includes frame elements 140 that surround the frame opening 104. In the illustrated embodiment, the frame 102 includes four frame elements 140 forming a rectangular frame opening 104. Greater or fewer frame elements 140 may be provided in alternative embodiments. The frame opening 104 may have other shapes in alternative embodiments. In an exemplary embodiment, the frame elements 140 are metal frame elements, such as extruded aluminum frame elements. The frame elements 140 extend along edges of the frame opening 104. In an exemplary embodiment, the LED strip assembly 110 is mounted to corresponding frame elements 140 to emit light into the optical element 106 along one or more edges of the optical element 106.

The edge lit LED fixture 100 positions the LED strip assembly 110 at the sides of the frame 102 with the light from the LEDs 114 beaming across the optical element 106. The optical element 106 redirects the light to the inner surface of the optical element 106. In the illustrated embodiment, a pair of LED strip assemblies 110 are provided on opposite sides of the frame 102. However, greater or fewer LED strip assemblies 110 may be provided in alternative embodiments. In an exemplary embodiment, the optical element 106 includes a light guide 142 and a diffuser plate 144 forward of the light guide 142 on an inner surface of the light guide 142. The light guide 142 directs the incoming light from the edges of the light guide 142 to the inner surface of the light guide 142 to direct the light into the diffuser plate 144. The optical element 106 may include other optical components in alternative embodiments.

Figure 2:
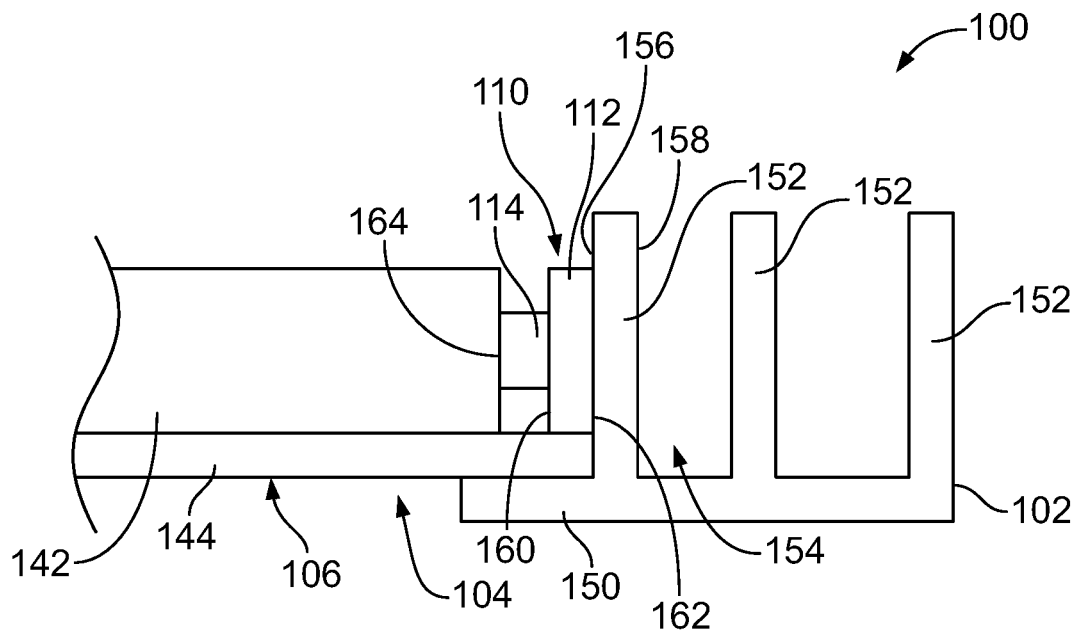
FIG. 2 is a cross-sectional view of a portion of the edge lit LED fixture in accordance with an exemplary embodiment having an LED strip assembly.

FIG. 2 is a cross-sectional view of a portion of the edge lit LED fixture 100 in accordance with an exemplary embodiment. FIG. 2 illustrates the optical element 106 and the LED strip assembly 110 coupled to the frame 102. The frame 102 includes a base 150 and one or more support walls 152 extending from the base 150. In the illustrated embodiment, the frame 102 includes three support walls 152; however, greater or fewer support walls 152 may be provided in alternative embodiments. The support walls 152 form channels 154. Optionally, portions of the power connector 120 (shown in FIG. 1) may be received in the channels 154. The optical element 106 is supported by the base 150 and extends across the frame opening 104. The optical element 106 is positioned adjacent the LED strip assembly 110 to receive light from the LEDs 114.

Each support wall 152 includes an inner surface 156 and an outer surface 158. The inner surface 156 faces the frame opening 104. In an exemplary embodiment, the PCB strip 112 is coupled to the inner surface 156 of the corresponding support wall 152. The PCB strip 112 includes a front 160 and a rear 162. The rear 162 is coupled to the inner surface 156 of the support wall 152. The front 160 faces the optical element 106 in the frame opening 104. The LEDs 114 are mounted to the front 160. The LEDs 114 include front surfaces 164 that face the optical element 106. Light emitted from the LEDs 114 is emitted into the light guide 142. The optical element 106 is edge lit by the LEDs 114. The optical element 106 emits the light from the diffuser plate 144 in a downward direction generally perpendicular to the light-emitting direction from the LEDs 114.

Figure 3:
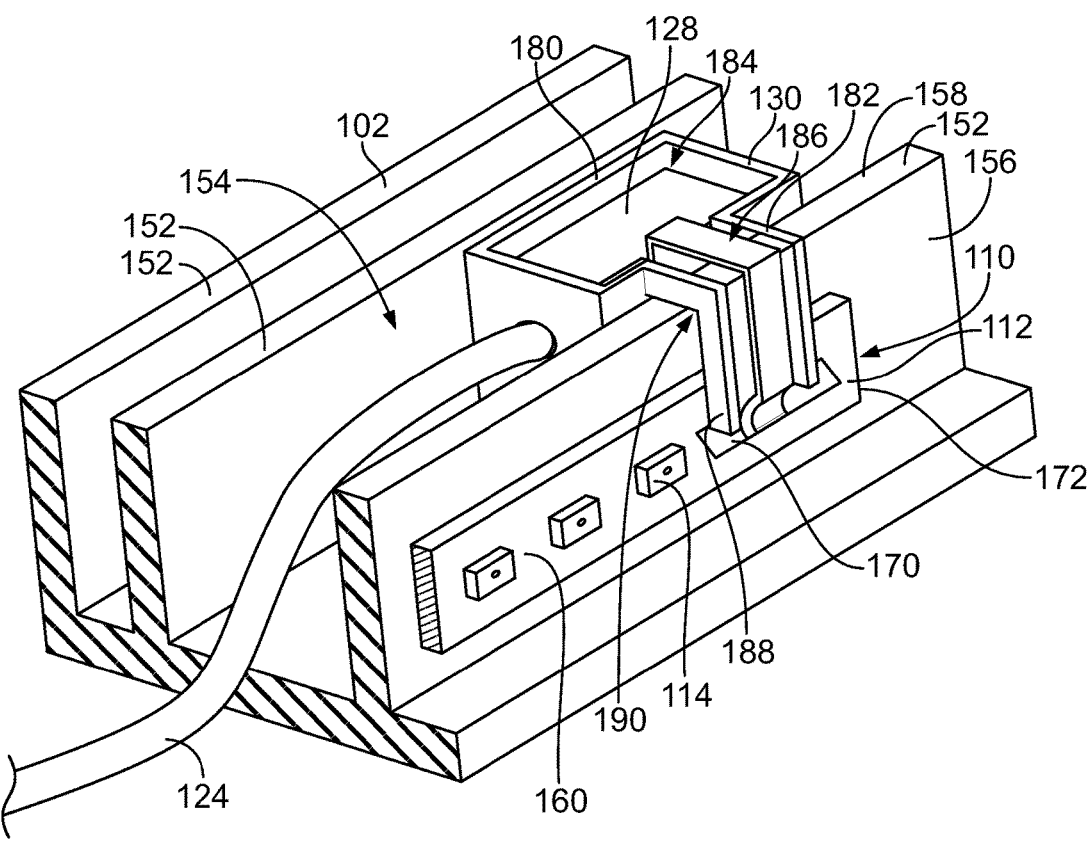
FIG. 3 is a front perspective view of a portion of the LED strip assembly in accordance with an exemplary embodiment.

FIG. 3 is a front perspective view of a portion of the LED strip assembly 110 in accordance with an exemplary embodiment. FIG. 3 illustrates the power wire contact 128 terminated to the power pad 170 at the front 160 of the PCB strip 112. The power pad 170 forms part of the power circuit of the PCB strip 112. The power pad 170 may be electrically connected to the LEDs 114 through traces, vias, pads or other circuit components of the power circuit. The power pad 170 may be provided at a side 172 of the PCB strip 112. Optionally, the opposite side (not shown) of the PCB strip 112 may include a second power pad 170 having a second power wire contact 128 mounted thereto. For example, one of the power pads 170 may be a positive power pad or anode and the other power pad 170 may be a negative power pad or cathode. The LEDs 114 are provided along the front 160 between the sides 172. The substrate of the PCB strip 112 may be long and narrow with the power pads 170 and the LEDs 114 in strip form along the front 160.

The connector housing 130 has a main body 180 and a support arm 182 extending from the main body 180. The main body 180 has a contact cavity 184 that receives a portion of the power wire contact 128. The support arm 182 has a contact channel 186 open to the contact cavity 184 that receives a portion of the power wire contact 128. The support arm 182 positions the power wire contact 128 relative to the support wall 152 of the frame 102. In an exemplary embodiment, the support arm 182 of the connector housing 130 includes a mounting tab 188 for mounting the connector housing 130 to the support wall 152. The support arm 182 electrically isolates the power wire contact 128 from the support wall 152. The support arm 182 positions the power wire contact 128 for mating with the power pad 170 of the PCB strip 112.

In an exemplary embodiment, the connector housing 130 is mounted to the frame 102 such that the main body 180 of the connector housing 130 is received in one of the channels 154. The main body 180 is located along the outer surface 158 of the support wall 152. The support arm 182 extends over the top of the support wall 152 and along the inner surface 156 of the support wall 152 to position the power wire contact 128 for mating with the power pad 170 of the PCB strip 112 forward of the inner surface 156 of the support wall 152. The support wall 152 is received in a gap 190 located between the mounting tab 188 of the support arm 182 and the main body 180. The PCB strip 112 is located in the gap 190 between the mounting tab 188 of the support arm 182 and the main body 180.

The power wire contact 128 and the connector housing 130 are positioned relative to the PCB strip 112 in a location that does not interfere with the light emission from the LEDs 114. For example, the power wire contact 128 and the connector housing 130 are located above and/or offset toward the side 172 relative to the LEDs 114 such that the LEDs 114 may emit light forward into the optical element 106 (shown in FIG. 2) without interference from the power wire contact 128 or the connector housing 130. The power wire contact 128 and the connector housing 130 do not create shadows or otherwise interfere with the lighting of the LED strip assembly 110. Additionally, the power wire 124 is routed in the channel 154 and does not create shadows or otherwise interfere with the lighting of the LED strip assembly 110.

Figures 4, 5:
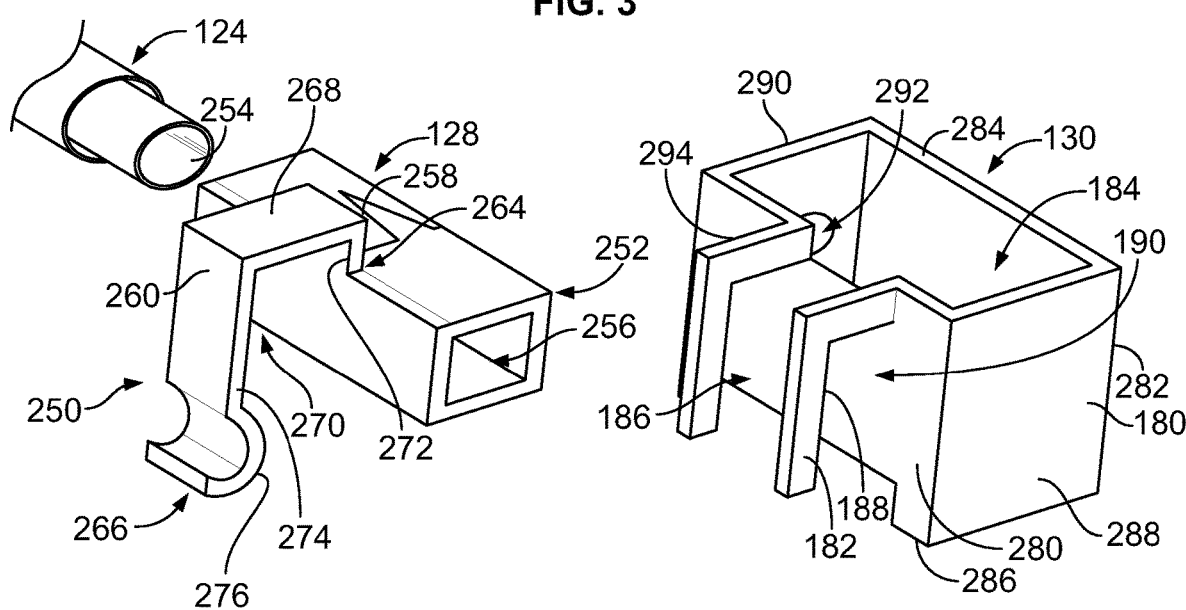
FIG. 4 is a front perspective view of a power wire contact of the LED strip assembly in accordance with an exemplary embodiment.
FIG. 5 is a front perspective view of a connector housing of the LED strip assembly in accordance with an exemplary embodiment.

FIG. 4 is a front perspective view of the power wire contact 128 in accordance with an exemplary embodiment. The power wire contact 128 includes a mating end 250 and a terminating end 252. The terminating end 252 is configured to be terminated to a wire end 254 of the power wire 124. In the illustrated embodiment, the terminating end 252 is a poke-in contact configured to receive the wire end 254 of the power wire 124. The terminating end 252 includes a poke-in receptacle 256 and a poke-in beam 258 extending into the poke-in receptacle 256. In the illustrated embodiment, the terminating end 252 is box shaped, however, the terminating end 252 may have other shapes in alternative embodiments. The wire end 254 of the power wire 124 is plugged into the poke-in receptacle 256 to engage the poke-in beam 258. The poke-in beam 258 mechanically and electrically connects the power wire contact 128 to the power wire 124. However, other types of terminating ends may be provided in alternative embodiments, such as a solder pad, a crimp barrel, an insulation displacement contact, a poke-in contact, and the like. The terminating end 252 may have retention features, such as barbs, interference features, blocking surfaces, and the like to retain the terminating end 252 in the connector housing 130 (shown in FIG. 3).

The mating end 250 of the power wire contact 128 includes a spring beam 260 extending from the box-shaped main body. The spring beam 260 is deflectable and configured to be spring biased against the power pad 170 (shown in FIG. 3). The spring beam 260 extends between a fixed end 264 and a distal end 266. In an exemplary embodiment, the spring beam 260 includes an extension 268 between the fixed end 264 and the distal end 266 to offset the distal end 266 from the main body of the power wire contact 128 at a spaced apart location such that a gap 270 is formed between the spring beam 260 and the main body of the power wire contact 128. In various embodiments, the spring beam 260 may be an upside-down U-shape or J-shape having a first arm 272 and a second arm 274 with the extension 268 between the first and second arms 272, 274. The gap 270 is located between the first and second arms 272, 274 below the extension 268. In an exemplary embodiment, the spring beam 260 includes a mating interface 276 at the distal end 266. The power wire contact 128 may have other shapes and features in alternative embodiments for mechanically and electrically connecting to the power wire contact 128.

FIG. 5 is a front perspective view of the connector housing 130 in accordance with an exemplary embodiment. The main body 180 may be manufactured from a dielectric material, such as a plastic material. The main body 180 may be molded, cast, printed or otherwise formed into a desired shape. The main body 180 of the connector housing 130 includes a front 280, a rear 282, a top 284, a bottom 286, a first end 288, and a second end 290. The contact cavity 184 is defined between the front 280 and the rear 282, between the top 284 and the bottom 286, and between the first and second ends 288, 290. In an exemplary embodiment, the contact cavity 184 is open at the top 284 to receive the power wire contact 128 in the contact cavity 184 through the open top 284. In an exemplary embodiment, the connector housing 130 includes a wire opening 292 at the first end 288 configured to receive the power wire 124. The wire opening 292 may be open at the top 284 to receive the power wire 124 from above with the power wire contact 128.

In an exemplary embodiment, the support arm 182 extends from the main body 180 at the top 284, such as at the front 280. Optionally, the support arm 182 to be approximately centered between the first and second ends 288, 290. The support arm 182 may be at other locations in alternative embodiments. In an exemplary embodiment, the support arm 182 includes an extension 294 extending between the main body 180 and the mounting tab 188 to offset the mounting tab 188 from the main body 180. The gap 190 is formed by the extension 294 spacing the mounting tab 188 apart from the front 280 of the main body 180. The width of the extension 294 may correspond to the width of the support wall 152 and/or the width of the PCB strip 112 to allow positioning of the support wall 152 and the PCB strip 112 in the gap 190.

The contact channel 186 is formed in the support arm 182. For example, the contact channel 186 extends along the top of the extension 294 and the front of the mounting tab 188. The contact channel 186 is open to the contact cavity 184, such as at the top 284 of the main body 180. The contact channel 186 may be open at the front 280 to allow the spring beam 260 of the power wire contact 128 two extend from the contact cavity 184 into the contact channel 186. The dielectric material of the connector housing 130 provide electrical insulation between the power wire contact 128 and the support wall 152.

Figure 6:
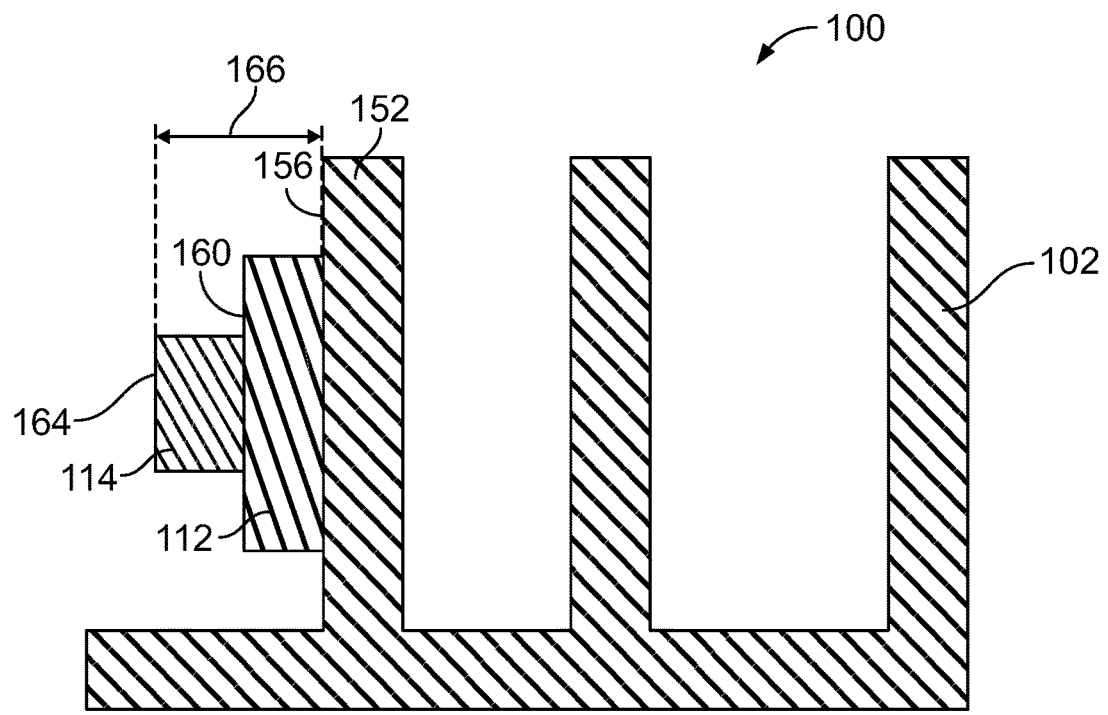
FIG. 6 is a cross-sectional view of a portion of the edge lit LED fixture showing a PCB strip mounted to a frame in accordance with an exemplary embodiment.

FIG. 6 is a cross-sectional view of a portion of the edge lit LED fixture 100 showing the PCB strip 112 mounted to the frame 102. The PCB strip 112 is mounted to the inner surface 156 of the support wall 152. The LEDs 114 are provided at the front 160 of the PCB strip 112. The front surface 164 of the LED 114 is located a distance 166 forward of the inner surface 156 of the support wall 152.

Figure 7:
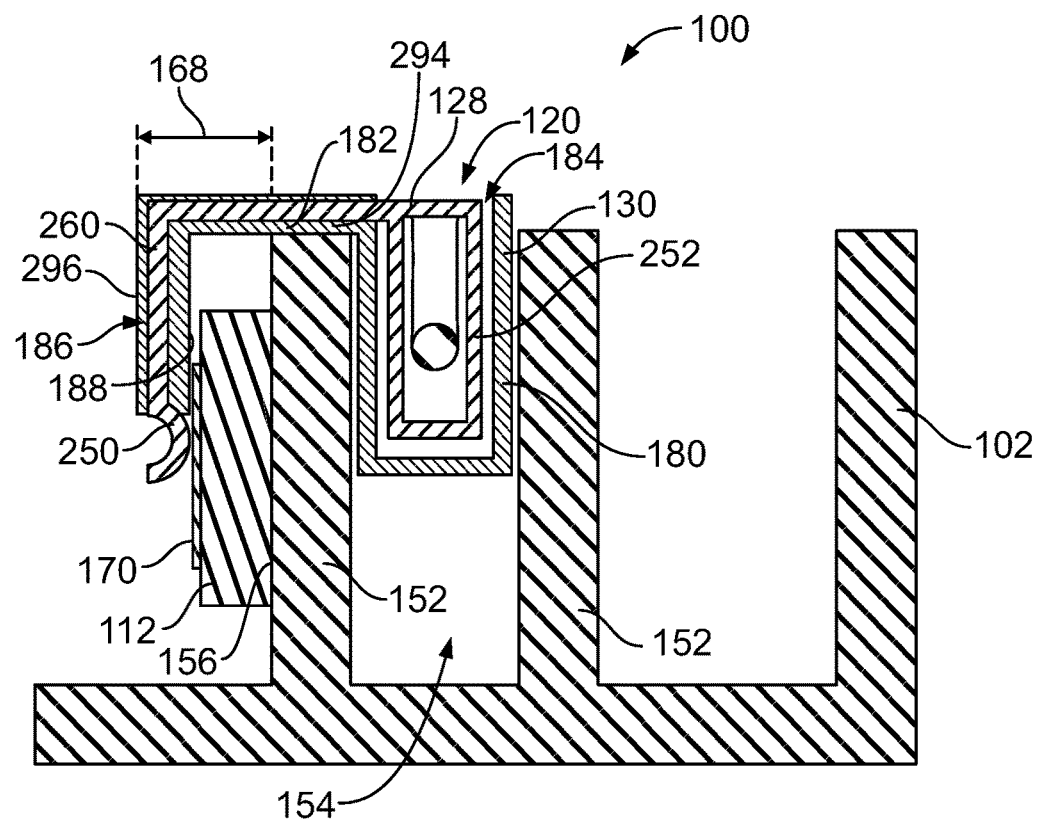
FIG. 7 is a cross-sectional view of a portion of the edge lit LED fixture showing a power connector mounted to the frame in accordance with an exemplary embodiment.

FIG. 7 is a cross-sectional view of a portion of the edge lit LED fixture 100 showing the power connector 120 mounted to the frame 102. The connector housing 130 is mounted to the support wall 152. The main body 180 of the connector housing 130 is located in the channel 154. The support arm 182 extends along the top of the support wall 152 forward of the inner surface 156 of the support wall 152.

The mounting tab 188 extends along the support wall 152 and is coupled to the support wall 152 and/or the PCB strip 112. In an exemplary embodiment, a front 296 of the support arm 182 is located a distance 168 forward of the inner surface 156 of the support wall 152. In an exemplary embodiment, the distance 168 is less than or equal to the distance 166 (shown in FIG. 6) such that the connector housing 130 is flush with or rearward of the front surface 164 of the LED 114. As such, the connector housing 130 does not interfere with the lighting provided by the LED 114. The connector housing 130 does not interfere with positioning of the optical element 106 in the frame 102.

The power wire contact 128 is held by the connector housing 130, such as by an interference fit, using retaining features, or by other means. The terminating end 252 is located in the contact cavity 184. The mating end 250 is located in the support arm 182. For example, the spring beam 260 extends in the contact channel 186 along the extension 294 and along the mounting tab 188 to interface with the power pad 170 at the front of the PCB strip 112. The power connector 120 may be plugged into the channel 154 of the frame 102 such that the spring beam 260 interfaces with the power pad 170 at a separable mating interface. The spring beam 260 is spring biased against the power pad 170 to create an electrical connection between the power wire contact 128 and the power circuit of the PCB strip 112.

Figure 8:
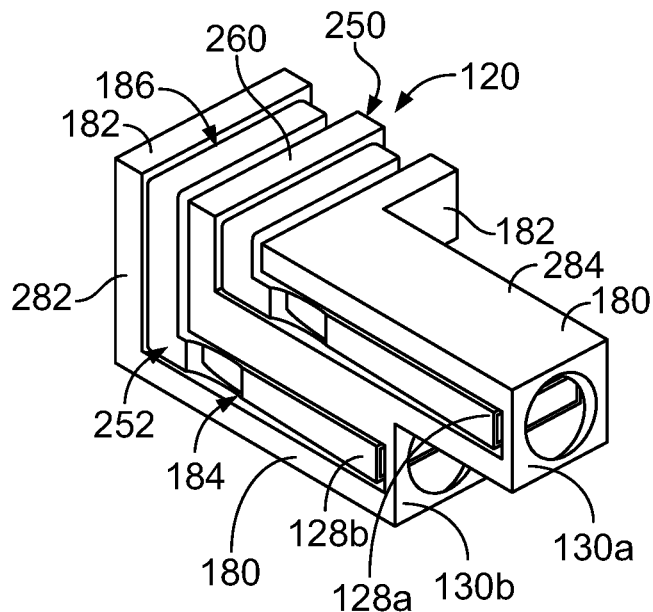
FIG. 8 is a perspective view of the power connector in accordance with an exemplary embodiment.

FIG. 8 is a perspective view of the power connector 120 in accordance with an exemplary embodiment. In the illustrated embodiment, the power connector 120 includes a first connector housing 130a and a second connector housing 130b. The first and second connector housings 130a, 130b receive corresponding first and second power wire contacts 128a, 128b. The first and second power wire contacts 128a, 128b each include a mating end 250 and a terminating end 252. The mating end 250 has a spring beam 260.

In various embodiments, the first and second connector housings 130a, 130b may be separate and discrete components coupled to each other and/or configured to be coupled to the frame 102. In alternative embodiments, the first and second connector housings 130a, 130b may be integral part of a unitary, monolithic connector housing structure. For example, the first and second connector housings 130a, 130b may be co-molded together.

The first and second connector housings 130a, 130b each include a main body 180 and a support arm 182. The first and second connector housings 130a, 130b each include a contact cavity 184 and a contact channel 186. In the illustrated embodiment, the contact cavities 184 are open at the rear 282. The contact channels 186 extend along the rear 282 and the top 284 to the support arms 182.

Figure 9:
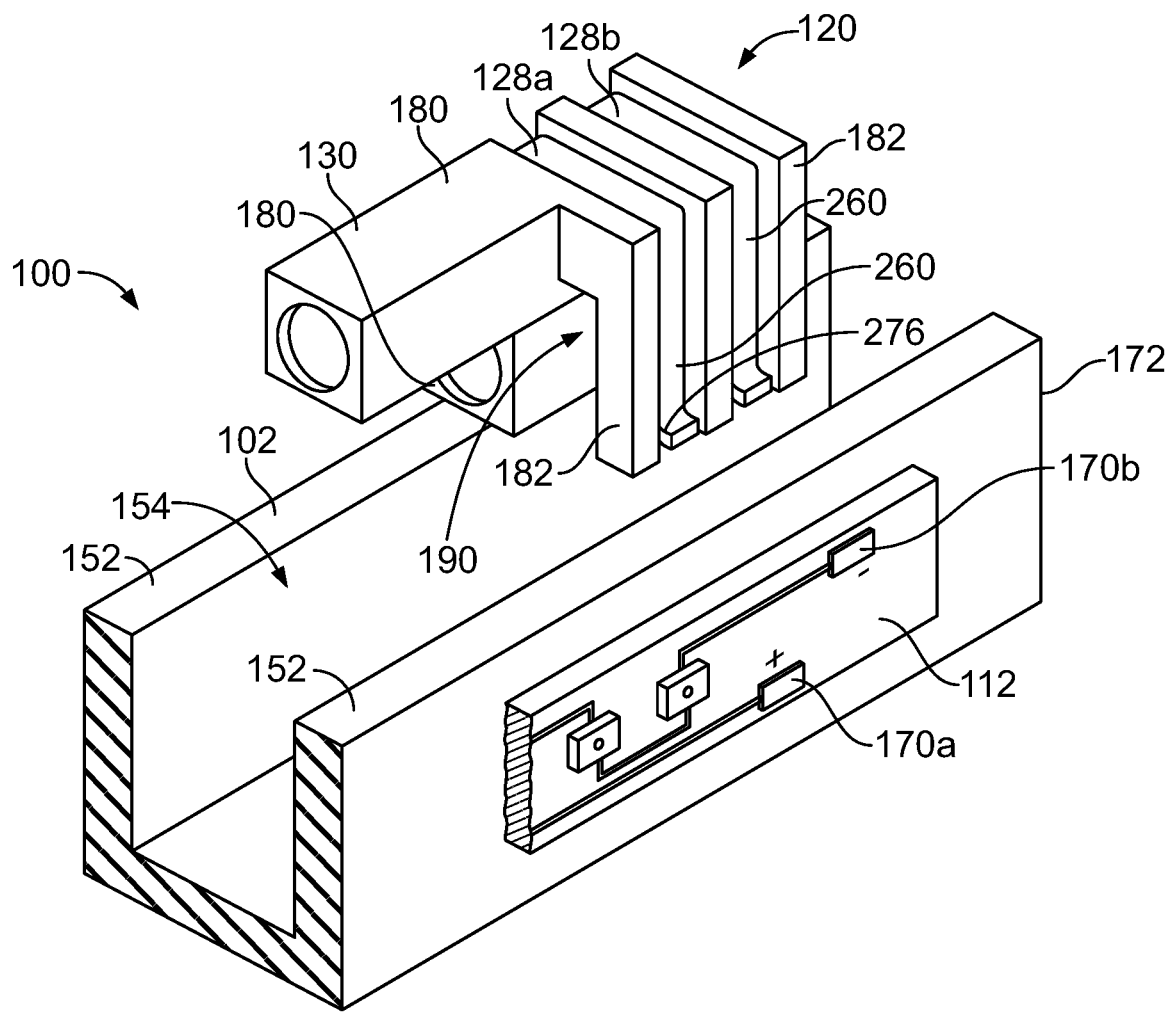
FIG. 9 is a front perspective view of a portion of the edge lit LED fixture in accordance with an exemplary embodiment.

FIG. 9 is a front perspective view of a portion of the edge lit LED fixture 100 in accordance with an exemplary embodiment. FIG. 9 illustrates the power connector 120 poised for coupling to the frame 102 and the PCB strip 112. In the illustrated embodiment, the PCB strip 112 includes a pair of power pads 170a, 170b at the side 172. For example, one of the power pads 170a is an anode and the other power pad 170b and the cathode. Optionally, the power pads 170 may be vertically and/or horizontally offset from each other, such as for trace routing and mating with the power wire contacts 128a, 128b.

The power connector 120 is configured to be coupled to the frame 102 by plugging the connector housing 130 into the channel 154 such that the support arms 182 overlap the support wall 152. The power connector 120 is coupled to the frame 102 such that the spring beams 260 interface with the power pads 170 at the front of the PCB strip 112. The support wall 152 and the PCB strip 112 are received in the gap 190 between the support arm 182 and the main body 180. Optionally, the spring beams 260 may be different lengths such that the mating interfaces 276 of the first and second power wire contacts 128a, 128b are offset from each other for mating with the power pads 170a, 170b.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An LED strip assembly for a light fixture, the LED strip assembly comprising:
 a PCB strip having a front and a rear extending between a first side and a second side, the rear configured to be mounted to an inner surface of a support wall of a frame of the light fixture, the PCB strip having a power circuit, the PCB strip having LEDs mounted to the front of the PCB strip and powered by the power circuit, the PCB strip having a power pad at the front of the PCB strip electrically connected to the power circuit; and
 a power connector electrically connected to the PCB strip, the power connector including a connector housing having a contact cavity, the connector housing having a main body and a mounting tab extending from the mounting tab, the main body configured to be located rearward of an outer surface of the support wall of the frame, the mounting tab configured to be mounted to the support wall of the frame of the light fixture and extend forward of the inner surface of the support wall of the frame, the power connector including a power wire assembly coupled to the main body of the connector housing, the power wire assembly including a power wire and a power wire contact terminated to the power wire, the power wire contact being received in the contact cavity, the power wire contact having a spring beam mechanically and electrically connected to the power pad at a separable mating interface to electrically connect the power wire to the power circuit.

2. The LED strip assembly of claim 1, wherein the power wire contact is electrically connected to the power pad by a solderless connection.

3. The LED strip assembly of claim 1, wherein the LEDs include a front surface facing the frame opening, the spring beam extending along the front of the PCB strip such that the spring beam is flush with or rearward of the front surface of the nearest LED.

4. The LED strip assembly of claim 1, wherein the LEDs include a front surface facing the frame opening, the mounting tab extending along the front of the PCB strip such that a front of the mounting tab is flush with or rearward of the front surface of the nearest LED.

5. The LED strip assembly of claim 1, wherein the mounting tab is L-shaped forming a gap between the mounting tab and a first side of the connector housing, the gap being configured to receive the support wall of the frame.

6. The LED strip assembly of claim 1, wherein the connector housing includes a support arm extending from the main body, the support arm forming the mounting tab and receiving the support wall of the frame between the support arm and the main body.

7. The LED strip assembly of claim 6, wherein the support arm electrically isolates the spring beam from the support wall of the frame.

8. The LED strip assembly of claim 1, wherein the connector housing includes a support arm extending from the main body, the support arm forming the mounting tab, the support arm including a contact channel open to the contact cavity, the contact channel receiving the spring beam of the power wire contact.

9. The LED strip assembly of claim 1, wherein the power wire contact includes a poke-in receptacle receiving the power wire and a poke-in beam engaging the power wire in the poke-in receptacle.

10. The LED strip assembly of claim 1, wherein the power wire contact includes a main body terminated to the power wire rearward of the support wall, the spring beam extending from the main body for connection with the power pad forward of the support wall.

11. The LED strip assembly of claim 10, wherein the main body is configured to be positioned rearward of an outer surface of the support wall and the spring beam is configured to be positioned forward of an inner surface of the support wall.

12. The LED strip assembly of claim 1, wherein the power wire and the main body of the connector housing are configured to be positioned rearward of the support wall and the spring beam extends forward of the support wall to interface with the power pad forward of the support wall at the separable mating interface.

13. The LED strip assembly of claim 1, wherein the main body includes a front, a rear, a top, a bottom, a first end, and a second end, the main body defining the contact cavity, the connector housing receiving the power wire through the first end, the mounting tab being secured to the support wall such that the front of the main body faces the support wall, the spring beam extending forward of the front to interface with the PCB strip forward of the main body of the connector housing.

14. The LED strip assembly of claim 1, wherein the contact cavity is a first contact cavity, the power wires a first power wire, and the power wire contact is a first power wire contact, the connector housing further comprising a second contact cavity, the power wire assembly further comprising a second power wire and a second power wire contact terminated to the second power wire, the second power wire contact being received in the second contact cavity, the second power wire contact having a spring beam mechanically and electrically connected to a second power pad of the power circuit.

15. The LED strip assembly of claim 14, wherein the connector housing includes a main body having the first contact cavity and the second contact cavity, the connector housing having a first support arm extending from the main body receiving the spring beam of the first power wire contact, the connector housing having a second support arm extending from the main body receiving the spring beam of the second power wire contact.

16. A power connector for an LED strip assembly of a light fixture, the power connector comprising:
a connector housing having a main body and a support arm extending from the main body, the main body having a contact cavity, the support arm having a contact channel open to the contact cavity, the support arm having a mounting tab configured to be mounted to a support wall of a frame of the light fixture, the main body configured to be positioned rearward of the support wall of the frame, the support arm extending from the main body to position the mounting tab remote from the main body with the mounting tab positioned forward of the support wall of the frame;
a power wire assembly coupled to the connector housing, the power wire assembly including a power wire having a wire end and a power wire contact, the power wire contact having a mating end and a terminating end, the terminating end being received in the contact cavity and being terminated to the wire end of the power wire, the mating end including a deflectable spring arm received in the contact channel having a mating interface, the spring arm being spaced apart from the terminating end by a gap, the gap configured to receive the support wall of the frame of the light fixture, the support arm insulating the spring arm from the support wall of the frame.

17. The power connector of claim 16, wherein the terminating end is configured to be positioned rearward of an outer surface of the support wall and the mating end is configured to be positioned forward of an inner surface of the support wall.

18. The power connector of claim 16, wherein the main body of the connector housing includes a front, a rear, a top, a bottom, a first end, and a second end defining the contact cavity, the connector housing receiving the power wire through the first end, the mounting tab of the support arm being secured to the support wall such that the front of the main body faces the support wall, the spring beam extending forward of the front to interface with the PCB strip forward of the main body of the connector housing.

19. A light fixture comprising:
a frame surrounding a frame opening, the frame having a base and a support wall extending from the base, the support wall having an inner surface facing the frame opening and an outer surface opposite the inner surface, the frame is configured to support an optical element in the frame opening; and
an LED strip assembly coupled to the frame, the LED strip assembly including a PCB strip having a front and a rear extending between a first side and a second side, the rear being coupled to the inner surface of the support wall with the front facing the optical element in the frame opening, the PCB strip having a power circuit, the PCB strip having LEDs mounted to the front of the PCB strip and powered by the power circuit to emit light to the optical element, the PCB strip having a power pad at the front of the PCB strip electrically connected to the power circuit, the LED strip assembly including a power connector terminated to the PCB strip, the power connector including a connector housing having a contact cavity, the connector housing located rearward of the outer surface of the support wall of the frame, the connector housing having a mounting tab located forward of the inner surface of the support wall of the frame and mounted to the support wall of the frame of the light fixture, the power connector including a power wire assembly coupled to the connector housing, the power wire assembly including a power wire and a power wire contact terminated to the power wire, the power wire contact being received in the contact cavity, the power wire contact having a spring beam mechanically and electrically connected to the power pad at a separable mating interface to electrically connect the power wire to the power circuit.

20. The light fixture of claim 19, wherein the connector housing includes a main body and a support arm forming the mounting tab, the main body being positioned rearward of the outer surface of the support wall, the support arm extending from the main body such that the mounting tab is forward of the inner surface of the support wall with the support wall positioned between the mounting tab and the main body of the connector housing, the support arm electrically isolating the spring beam from the support wall.

\* \* \* \* \*